US006574468B1

(12) United States Patent
Tanaka

(10) Patent No.: US 6,574,468 B1

(45) Date of Patent: Jun. 3, 2003

(54) CALLING NUMBER DELIVERY SYSTEM

(75) Inventor: Hirokazu Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/376,351

(22) Filed: Aug. 18, 1999

(30) Foreign Application Priority Data

Aug. 19, 1998 (JP) .......................................... 10-233042

(51) Int. Cl.[7] ................................................ H04M 3/42

(52) U.S. Cl. ....................... 455/415; 455/445; 455/424

(58) Field of Search ................................ 455/415, 554, 455/403, 560, 414, 445, 3.05; 379/220, 142; 358/434

(56) References Cited

U.S. PATENT DOCUMENTS

| | | | | | |
|---|---|---|---|---|---|
| 4,213,009 | A | * | 7/1980 | Suzuki | 179/24 EA |
| 4,383,138 | A | * | 5/1983 | Castro et al. | 179/84 C |
| 4,775,996 | A | * | 10/1988 | Emerson et al. | 379/56 |
| 5,341,411 | A | * | 8/1994 | Hashimoto | 379/67 |
| 5,365,592 | A | * | 11/1994 | Horner et al. | 381/46 |
| 5,390,233 | A | | 2/1995 | Jensen et al. | |
| 5,412,711 | A | * | 5/1995 | Hayashi | 379/67 |
| 5,530,945 | A | | 6/1996 | Chavez, Jr. et al. | |
| 5,577,113 | A | * | 11/1996 | Bray et al. | 379/220 |
| 5,629,976 | A | * | 5/1997 | Loke et al. | 379/61 |
| 5,703,933 | A | * | 12/1997 | Ghisler | 379/58 |
| 5,812,955 | A | * | 9/1998 | Dent et al. | 455/561 |
| 5,956,650 | A | * | 9/1999 | Suzuki et al. | 455/550 |
| 6,014,560 | A | * | 1/2000 | Kramer | 455/414 |
| 6,072,859 | A | * | 6/2000 | Kong | 379/88.16 |
| 6,104,909 | A | * | 8/2000 | Baldwin et al. | 455/5.1 |
| 6,115,142 | A | * | 9/2000 | Leung | 358/434 |
| 6,181,953 | B1 | * | 1/2001 | Shirota et al. | 455/557 |
| 6,215,868 | B1 | * | 4/2001 | Inoue | 379/387 |
| 2001/0044274 | A1 | * | 11/2001 | Jokelainen et al. | 455/3.05 |

FOREIGN PATENT DOCUMENTS

| | | | | |
|---|---|---|---|---|
| JP | 03093394 A | * | 4/1991 | H04Q/7/04 |
| JP | 10-93712 | | 4/1998 | |
| JP | 10-108258 | | 4/1998 | |

* cited by examiner

*Primary Examiner*—Thanh Cong Le
*Assistant Examiner*—C. Chow
(74) *Attorney, Agent, or Firm*—Sughrue Mion, PLLC

(57) ABSTRACT

Disclosed is a calling number delivery system in which an exchange and a base station are connected via an analog line and FSK modulated calling number information is transmitted to the base station. In the base station, the calling number information is read from the FSK modulated signal by an FSK demodulating circuit and an information extracting circuit and is transmitted to a subscriber's station over a control channel. The calling number information is sent to an FSK modulating circuit, modulated into an FSK modulated signal, and the FSK modulated signal is transferred to a telephone.

6 Claims, 6 Drawing Sheets

CALLING NUMBER DELIVERY SYSTEM

BACKGROUND OF THE INVENTION

1. Field of the Invention

The present invention relates to a calling number delivery system and, more particularly, a calling number delivery system for delivering calling number information over a control channel without using a communication channel in a radio channel interval between a base station and a plurality of subscriber's stations at the occasion of delivering calling number information in a system in which an exchange and a plurality of subscriber's terminals (telephones) are connected over a radio channel.

2. Description of the Related Art

FIG. 6 is a diagram showing a connection sequence in a conventional calling number delivery system. In FIG. 6, calling number delivery (CND) through an analog line (subscriber's line) is performed by an FSK modulated signal between a first ringing signal and a second ringing signal at the time of reception of an incoming call.

In a system in which an exchange and a subscriber's terminal are connected by radio, generally, transmission is executed by using a radio channel consisting of a control channel and a communication channel. Upon receipt of an incoming call, the incoming call is notified to the subscriber's station over the control channel and an analog signal used for communication is converted to a digital signal which is sent over the communication channel.

In case of performing the calling number delivery in the system in which an exchange and a telephone are connected via a radio channel, a base station has to detect the reception of an incoming call, notify it to a subscriber's station over a control channel, assure a communication channel to send FSK modulated calling number information, and deliver the calling number information over the communication channel to the subscriber's station.

In case of delivering the calling number information over the communication channel, it is necessary to establish the communication channel for each reception of a call. For example, even when the subscriber is absent, the communication channel is assured, so that effective use of the communication channel is hindered as a result.

SUMMARY OF THE INVENTION

It is an object of the invention to achieve effective use of a communication channel by reading FSK modulated calling number information within a base station, sending the information to a plurality of subscriber's stations over a control channel, and demodulating the FSK modulated signal by the subscriber's station, without sending the FSK modulated calling number information over the communication channel.

According to the invention, in order to achieve the object, there is provided a calling number delivery system in which a base station connected to an exchange via a first analog line and a plurality of subscriber's stations connected to telephones via second analog lines are connected via a radio channel, wherein the base station comprises: ringer detecting means for detecting a ringer when a call sent from the exchange via the first analog line is received; calling number information extracting means for detecting calling number information in an FSK modulated signal transmitted via the first analog line and extracting the calling number information from the FSK modulated signal; and information transferring means for transferring the calling number information and ringer information to the subscriber's station over a control channel in the radio channel, and the subscriber's station comprising: information receiving means for receiving the ringer information and the calling number information transferred from the base station over the control channel in the radio channel; ringer generating means for extracting the ringer information from the information receiving means and generating a ringer; FSK modulating means for extracting the calling number information from the information receiving means and FSK modulating the calling number information; and selective transmitting means for performing switching between the FSK modulated calling number information and the ringer and selectively transmitting the switched information to the telephone via the second analog line.

The ringer detecting means in the base station is constructed by a ringer detecting circuit, the calling number information extracting means comprises an FSK demodulating circuit for demodulating the FSK modulated signal in an analog signal transmitted from the exchange and an information extracting circuit for reading the calling number information from the demodulated digital data outputted from the FSK demodulating circuit, and the information transferring means is constructed by a control circuit in the base station.

In order to delay the FSK modulated signal until the information extracting circuit starts operating, the FSK modulating circuit is added with signal delaying means including: an A/D converter for converting the FSK modulated signal supplied through the first analog line into a digital signal; a signal delaying circuit for delaying an output of the A/D converter, and a D/A converter for converting an output of the signal delaying circuit into an analog signal and supplying the analog signal to the FSK demodulating circuit.

The information receiving means in the subscriber's station is constructed by a control circuit in the subscriber's station, the FSK modulating means is constructed by an FSK modulating circuit, and the selective transmitting means is constructed by a switching circuit.

DETAILED DESCRIPTION OF PREFERRED EMBODIMENTS OF THE INVENTION

Figure 1:
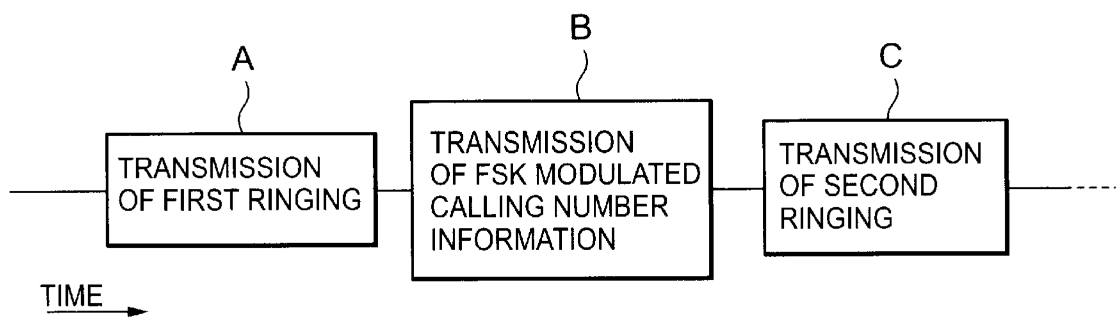
FIG. 1 is a block diagram for explaining the operation of an exchange at the time of reception of an incoming call in a first embodiment of the invention.

FIG. 1 is a block diagram for explaining the operation of an exchange at the time of reception of an incoming a call.

In FIG. 1, a first ringing signal is transmitted (FIG. 1A) and then calling number information which is FSK modulated is transmitted (FIG. 1B). After that, a second ringing signal is transmitted (FIG. 1C) and third, fourth, and subsequent ringing signals are transmitted until there is a response from a telephone.

Figure 2:
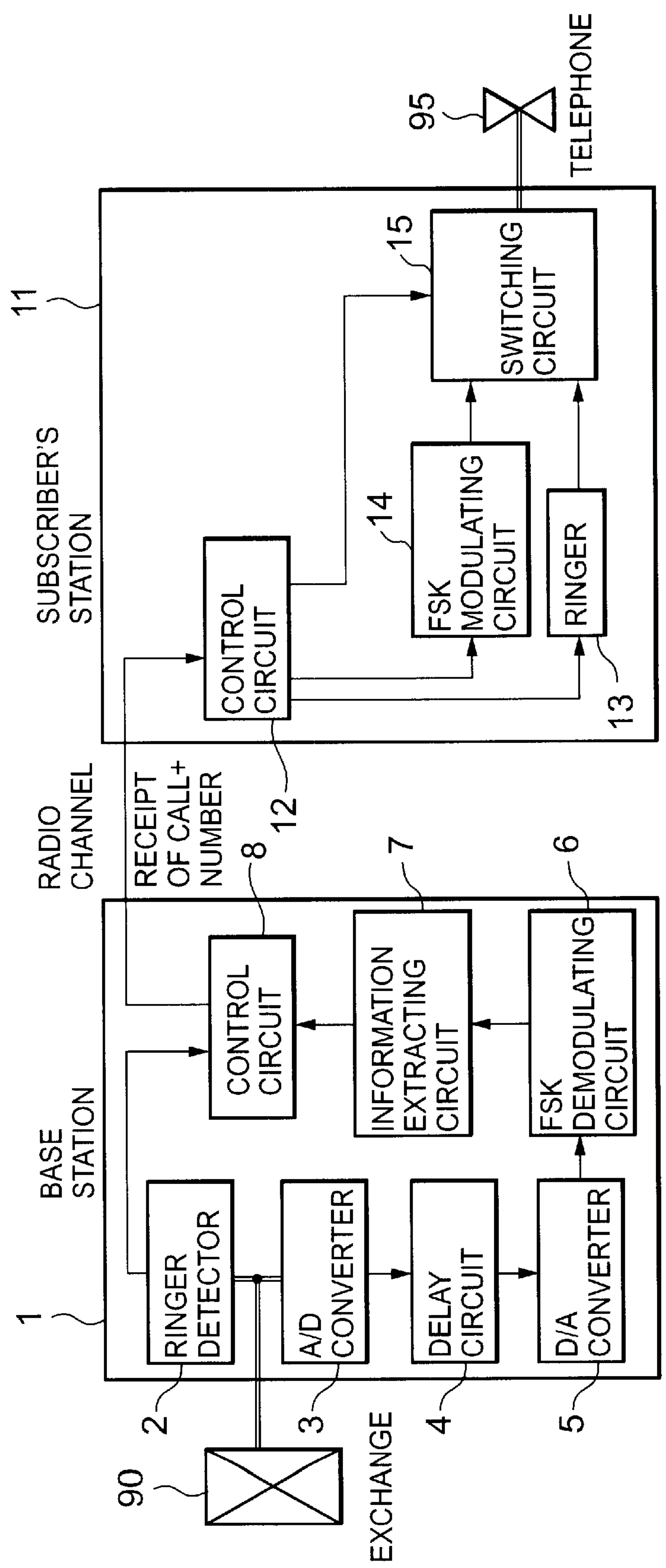
FIG. 2 is a block diagram showing the first embodiment of the invention.

FIG. 2 is a block diagram showing a first embodiment of the invention. As shown in FIG. 2 of the principal of the invention, an exchange 90 and a base station 1 are connected via an analog line and FSK modulated calling number information is transmitted from the exchange 90 via the analog line to the base station 1.

In the base station 1, the calling number information is read from the FSK modulated signal by an FSK demodulating circuit 6 and an information extracting circuit 7. The calling number information is transmitted from the base station 1 to a subscriber's station 11 via a radio channel.

In the subscriber's station 11, the calling number information is sent to an FSK modulating circuit 14. The FSK modulating circuit 14 FSK modulates the calling number information, and the resultant signal is sent to a telephone 95.

The calling number information from the base station 1 to the subscriber's station 11 can be delivered over the control channel without using a communication channel.

Consequently, the communication channel is not used to deliver the calling number information but can be used only for communication.

The embodiment of the invention will now be described specifically with reference to the drawings.

Referring to FIG. 2, reference numeral 1 denotes the base station connected to subscribers' terminal by radio, 11 denotes a subscriber's station, and 90 indicates the exchange which is connected to the base station 1 via an analog line.

An analog signal from the exchange 90 sent over the analog line is supplied to a ringer detector 2 and an A/D converter 3. The ringer detector 2 detects a ringing signal indicative of reception of an incoming call and notifies a control circuit 8 of the reception.

The A/D converter 3 converts the analog signal into a digital signal and sends the digital signal to a delay circuit 4. The delay circuit 4 is to delay the received digital signal and output the delayed signal and is constructed by a buffer or a memory.

A D/A converter 5 converts the digital signal again into the analog signal and sends the analog signal to the FSK demodulating circuit 6.

The FSK demodulating circuit 6 demodulates the FSK modulated signal in the analog signal and outputs the demodulated data.

The information extracting circuit 7 reads the calling number information from the data demodulated by the FSK demodulating circuit 6 and sends the data to the control circuit 8.

The control circuit 8 acquires the information indicative of reception from the ringer detector 2 and outputs the calling number information from the information extracting circuit 7. The reception information and the calling number information is transmitted by radio over the control channel in the radio channel provided between the base station 1 and the subscriber's station 11.

In the subscriber's station 11, a control circuit 12 obtains the reception information and the calling number information through the control channel.

The control circuit 12 operates a ringing signal generating circuit (ringer) 13 for generating a ringing signal and sends the calling number information to the FSK modulating circuit 14.

The ringer 13 generates the ringing signal and sends it to a switching circuit 15.

The FSK modulating circuit 14 FSK modulates the calling number information and sends the FSK modulated signal to the switching circuit 15.

The switching circuit 15 is controlled by the control circuit 12, thereby performing switching between the ringing signal generated by the ringer 13 and the calling number information which is FSK modulated by the FSK modulating circuit 14 and sending the switched information through an analog line connected to the telephone 95.

Figure 3:
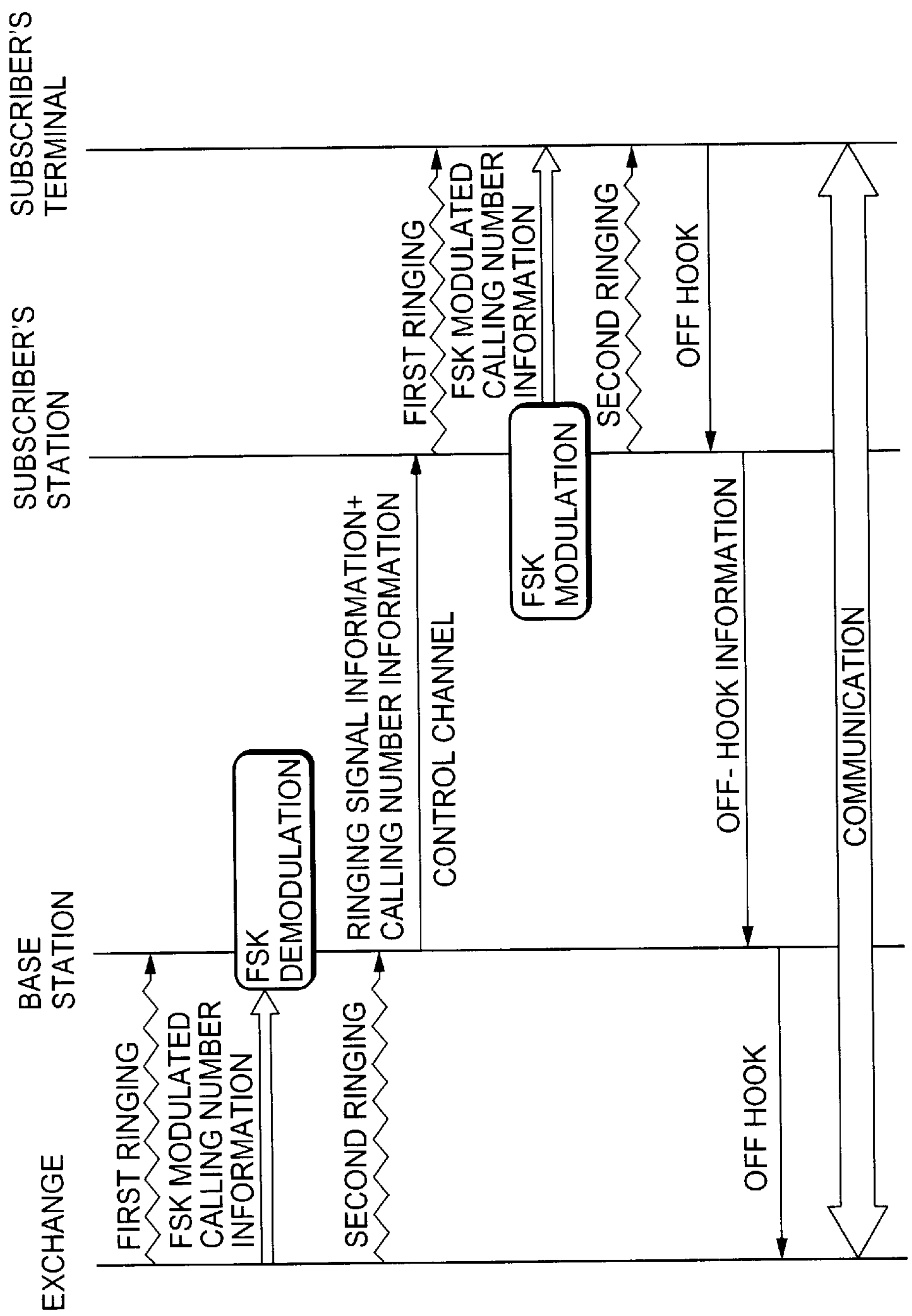
FIG. 3 shows a calling number information connecting sequence in the first embodiment of the invention.

The operation of the first embodiment will now be described hereinbelow with reference to the block diagram of FIG. 2 and the connecting sequence diagram of FIG. 3.

The operation of the exchange 90 when an incoming call is received from the exchange 90 is as illustrated in FIG. 1.

Specifically, the exchange 90 transmits the first ringing signal through the analog line (FIG. 1A) and transmits the calling number information which is FSK modulated (FIG. 1B).

In the base station 1, the transmission (FIG. 1A) of the first ringing signal is detected by the ringer detector 2 connected to the analog line and the control circuit 8 is notified of the reception of the incoming call.

The A/D converter 3 is also connected to the exchange 90 via the analog line.

The A/D converter 3, the delay circuit 4, and the D/A converter 5 are used as a set to delay the analog signal. The purpose of delaying the analog signal is to delay the FSK modulated signal until the FSK demodulating circuit 6 and the information extracting circuit 7 start the operation since the FSK demodulating circuit 6 and the information extracting circuit 7 have to start the operation when the FSK modulated calling number information is transmitted (FIG. 1B).

The analog signal is converted into a digital signal by the A/D converter 3 and the digital signal is sent to the delay circuit 4. The delay circuit 4 temporarily holds the sent digital signal. After the FSK demodulating circuit 6 and the information extracting circuit 7 start operating, the delay circuit 4 outputs the digital signal to the D/A converter 5. The D/A converter 5 converts the digital signal into an analog signal and sends the analog signal to the FSK demodulating circuit 6.

The FSK demodulating circuit 6 receives the analog signal, demodulates the FSK modulated calling number information and sends the demodulated digital signal to the information extracting circuit 7.

The information extracting circuit 7 reads the calling number information in the digital signal sent from the FSK demodulating circuit 6 and sends the read information to the control circuit 8 in the base station.

The control circuit 8 is notified by the ringer detector 2 of the reception of the incoming call and is notified by the information extracting circuit 7 of the calling number information, thereby obtaining the reception information and the calling number information.

The control circuit 8 sends the reception information and the calling number information to the control circuit 12 in the subscriber's station over the control channel using the radio channel between the base station 1 and the subscriber's station 11.

After receiving the reception information and the calling number information from the control circuit 8 in the base station, the control circuit 12 in the subscriber's station instructs the ringer 13 to operate in response to the reception information, and sends the calling number information to the FSK modulating circuit 14.

The ringer 13 generates a ringing signal and sends it to the switching circuit 15. The FSK modulating circuit 14 FSK modulates the calling number information and sends the FSK modulated signal to the switching circuit 15. The switching circuit 15 is controlled by the control circuit 12 and switches so that the calling number information FSK modulated by the FSK modulating circuit 14 is sent over the analog line to the telephone 95 between the first and second ringing signals generated by the ringer 13.

A second embodiment of the invention will be described in detail hereinbelow with reference to the drawings.

Figure 4:
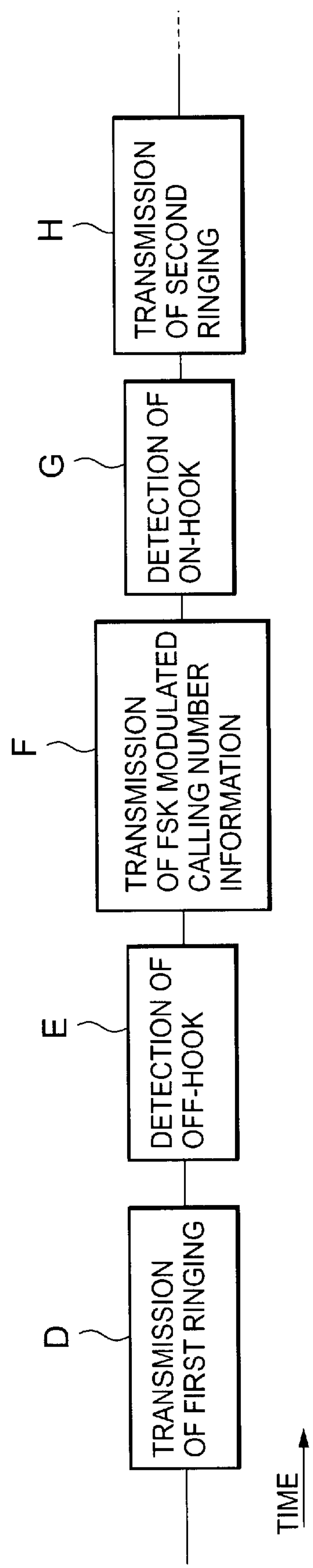
FIG. 4 is a block diagram for explaining the operation of an exchange at the time of reception of an incoming call in a second embodiment of the invention.
Figure 5:
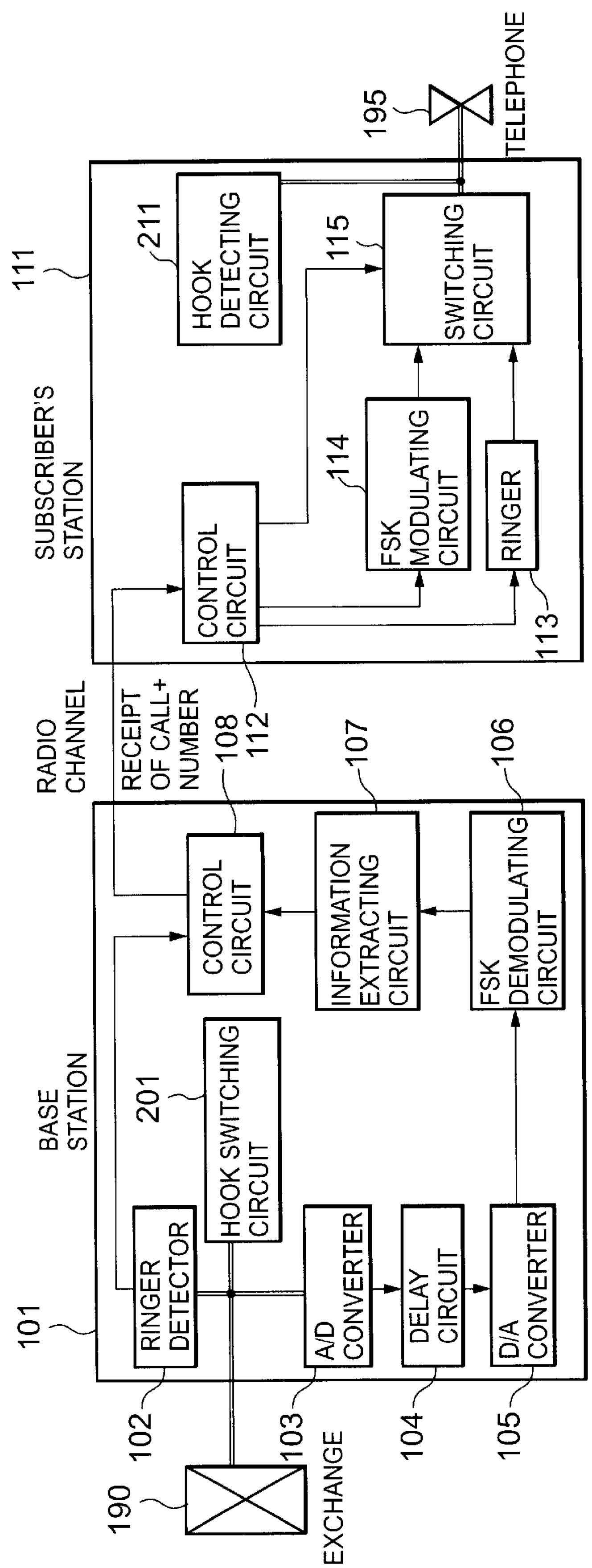
FIG. 5 is a block diagram showing the second embodiment of the invention.
Figure 6:
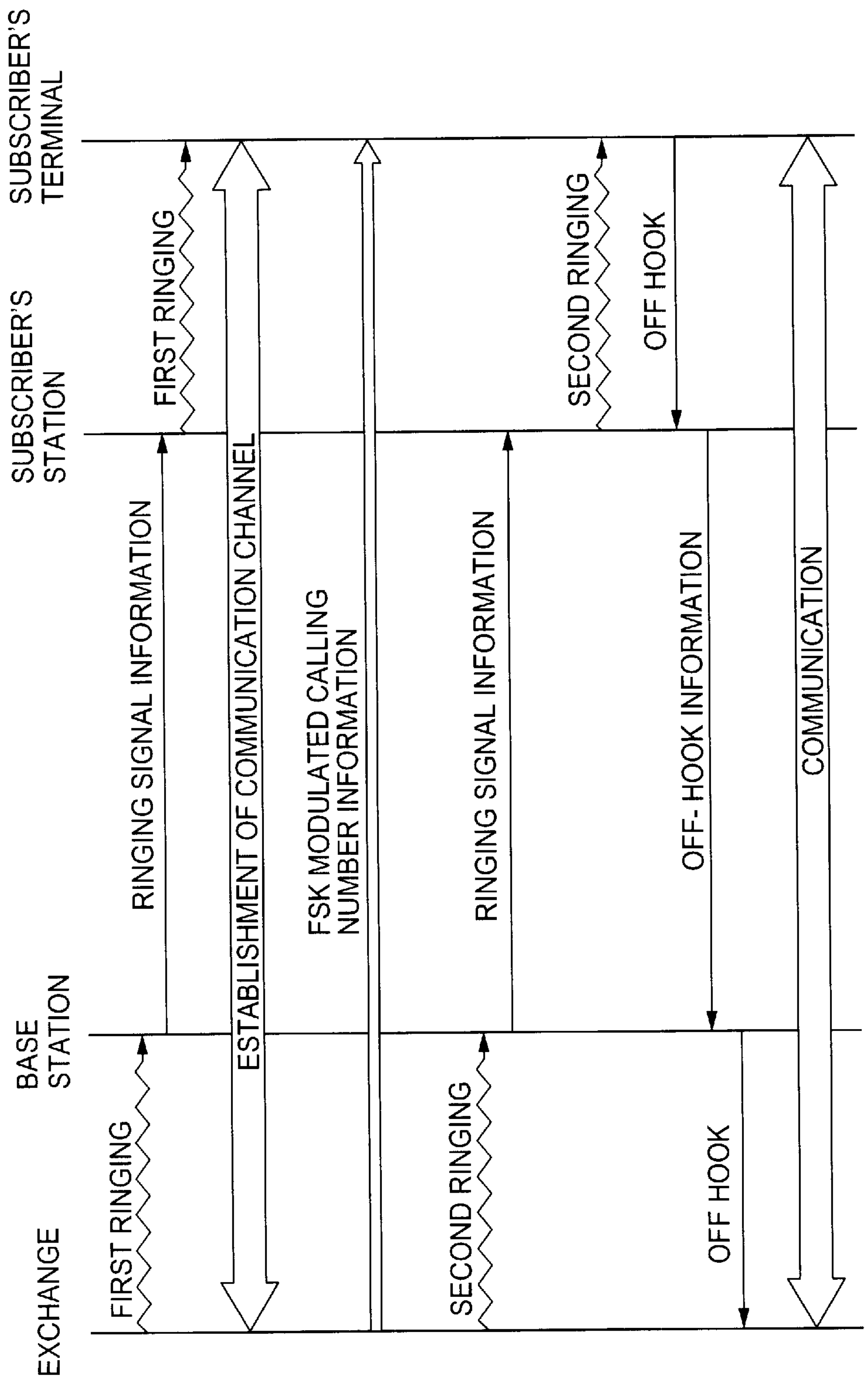
FIG. 6 is a diagram for explaining a conventional calling number information connecting sequence.

FIG. 5 is a block diagram of the second embodiment in which the exchange operates as illustrated in FIG. 4.

In FIG. 4, after the exchange transmits the first ringing signal at the time of reception of the incoming call (FIG. 4D), the exchange detects an off-hook state of the telephone 95 (FIG. 4E). After the off-hook state is detected, the calling number information which is FSK modulated is transmitted (FIG. 4F). After that, the exchange detects an on-hook state of the telephone 95 (FIG. 4G). After the on-hook state is detected, the second ringing signal is transmitted (FIG. 4H). The third, fourth, and subsequent ringing signals are transmitted until the call is responded by the telephone.

Referring to FIG. 5, in the second embodiment, a hook switching circuit 201 is provided in a base station 101 and a hook detecting circuit 211 is provided in a subscriber's station 111.

The operation of the second embodiment shown in FIG. 5 will now be described. The base station 101 detects the transmission (D) of the first ringing signal from an exchange 190 and then makes the off-hook state by the hook switching circuit 201. The exchange 190 detects the off-hook state (FIG. 4E) and, after that, sends the calling number information which is FSK modulated (FIG. 4F). The base station 101 reads the calling number information by an information extracting circuit 107 and makes the on-hook state by the hook switching circuit 201. After the exchange 190 detects the on-hook state (FIG. 4G), the exchange 190 sends the second ringing signal (FIG. 4H).

On the other hand, in the subscriber's station 111, after the first ringing signal from a ringing signal generating circuit (ringer) 113 is sent through a switching circuit 115 to a telephone 195, an off-hook state of the telephone 195 is detected by the hook detecting circuit 211.

After the off-hook state is detected by the hook detecting circuit 211, the calling number information which is modulated by an FSK modulating circuit 114 is sent to the telephone 195 through a switching circuit 115.

After the FSK modulated signal is sent, an on-hook state of the telephone 195 is detected by the hook detecting circuit 211 and the second and subsequent ringing signals from the ringer 113 are sent via the switching circuit 115 to the telephone 195.

According to the invention, the calling number information sent via the analog line can be transferred over the control channel without using the communication channel in the radio channel interval between the base station and the subscriber's station. The communication channel can be therefore effectively used.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A calling number delivery system for delivering calling number information via a radio channel between a base station connected to an exchange and a plurality of subscriber's stations, the base station comprising:

ringer detecting means for detecting a ringer when a call sent from the exchange via a first analog line is received;

calling number information extracting means for detecting calling number information in an FSK modulation signal transmitted via the first analog line and extracting the calling number information from the FSK modulated signal; and information transferring means for transferring the calling number information and ringer information to the subscriber's station over a control channel in the radio channel, and the subscriber's station comprising:

information receiving means for receiving the ringer information and the calling number information transferred from the base station over the control channel in the radio channel;

ringer generating means for extracting the ringer information from the information receiving means and generating a ringer;

FSK modulating means for extracting the calling number information from the information receiving means and FSK modulating the calling number information; and selective transmitting means for performing switching between the FSK modulated calling number information and the ringer and selectively transmitting the switched information to the telephone via a second analog line.

2. A calling number delivery system according to claim 1, wherein the ringer detecting means in the base station is constructed by a ringer detecting circuit, the calling number information extracting means comprises an FSK demodulating circuit for obtaining demodulation data from the FSK modulated signal in an analog signal transmitted from the exchange and an information extracting circuit for reading the calling number information from the demodulation data outputted from the FSK demodulating circuit, and the information transferring means is constructed by a control circuit in the base station.

3. A calling number delivery system according to claim 2, further comprising signal delaying means including:

an A/D converter for converting the FSK modulated signal supplied through the first analog line into a digital signal;

a signal delaying circuit for delaying an output of the A/D converter, and a D/A converter for converting an output of the signal delaying circuit into an analog signal and supplying the analog signal to the FSK demodulating circuit.

4. A calling number delivery system according to claim 1, wherein the information receiving means in the subscriber's station is constructed by a control circuit in the subscriber's station, the FSK modulating means is constructed by an FSK modulating circuit, and the selective transmitting means is constructed by a switching circuit.

5. A calling number delivery system for delivering calling number information via a radio channel between a base station connected to an exchange and a plurality of subscriber's stations, the base station comprising:

ringer detecting means for detecting a ringer when a call sent from the exchange via a first analog line is received;

calling number information extracting means for detecting calling number information in an FSK modulated signal transmitted via the first analog line and extracting the calling number information from the FSK modulated signal; and information transferring means for transferring the calling number information and ringer information to the subscriber's station over a control channel in the radio channel, and the subscriber's station comprising:

information receiving means for receiving the ringer information and the calling number information transferred from the base station over the control channel in the radio channel;

ringer generating means for extracting the ringer information from the information receiving means and generating a ringer;

FSK modulating means for extracting the calling number information from the information receiving means and FSK modulating the calling number information; and selective transmitting means for performing switching between the FSK modulated calling number information and the ringer and selectively transmitting the switched information to the telephone via a second analog line, wherein the first analog line of the base station is provided with a hook switching circuit and the second analog line of the subscriber's station is provided with a hook detecting circuit, the base station detects transmission of a first ringer from the exchange and makes an off-hook state by the hook switching circuit, the exchange detects the off-hook state and transmits the FSK modulated calling number information, the base station reads the calling number information by the calling number information extracting means and makes an on-hook state by the hook switching circuit, and the exchange detects the on-hook state and transmits a second ringer.

6. A calling number delivery system according to claim 5, wherein the subscriber's station detects an off-hook state of a telephone by the hook detecting circuit after the first ringer is transmitted to the telephone, sends the calling number information which is FSK modulated to the telephone after detecting the off-hook state by the hook detecting circuit, detects an on-hook state of the telephone by the hook detecting circuit after the transmission of the FSK modulated signal, and sends the second and subsequent ringing signals to the telephone.

* * * * *